W. TUCKER.
Rotary Harrow.
No. 21,787. Patented Oct. 12, 1858.
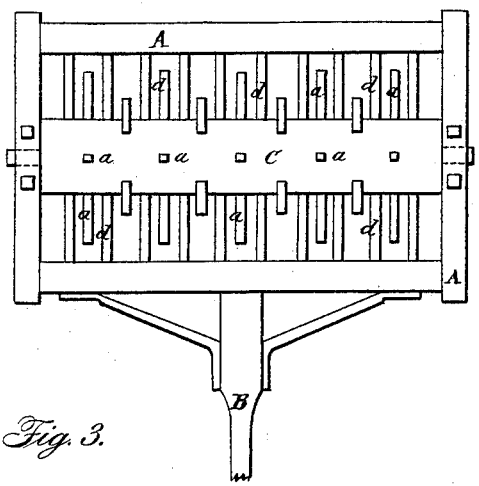
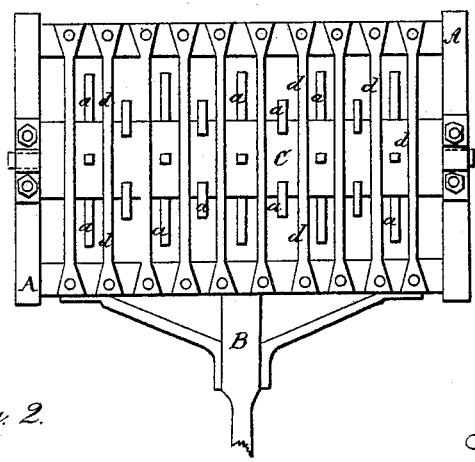
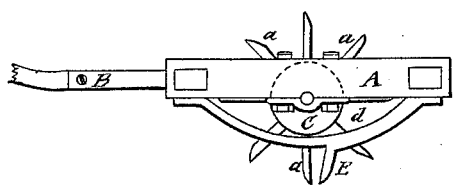
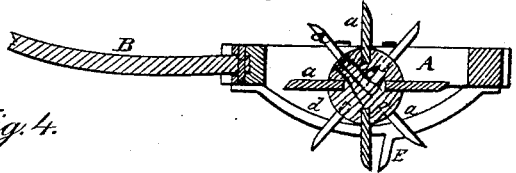
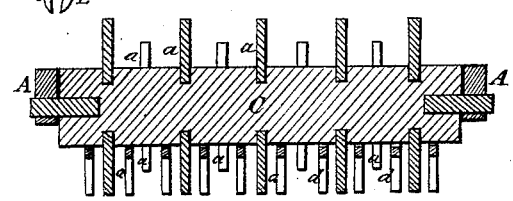

UNITED STATES PATENT OFFICE.

WM. TUCKER, OF BLACKSTONE, MASSACHUSETTS.

IMPROVEMENT IN CULTIVATORS.

Specification forming part of Letters Patent No. 21,787, dated October 12, 1858.

*To all whom it may concern:*

Be it known that I, WILLIAM TUCKER, of Blackstone, in the county of Worcester and State of Massachusetts, have invented a new or improved rotary cultivator for digging and breaking land or preparing it to be planted; and I do hereby declare that the same is fully described and represented in the following specification and the accompanying drawings, of which—

Figure 1 is a top view, Fig. 2 a side elevation, Fig. 3 a bottom view, Fig. 4 a longitudinal section, and Fig. 5 a transverse section, of said cultivator.

The nature of my invention consists in the combination of a rotary toothed drum or rotary series of teeth with a series of grid-bars and teeth projecting from such bars, the whole being arranged, applied to a frame, and constituting a new or improved cultivator to be used in breaking up the soil preparatory to its being planted.

In the drawings above mentioned, A represents a rectangular frame, from which projects a pole, B, in manner as shown in the drawings, such pole being for the purpose of enabling one or animals to be suitably attached to the cultivator for the purpose of drawing it over the surface of the soil; or, instead of such pole, shafts or thills may be employed.

A rotary drum, C, armed with rows of radial teeth $a\ a\ a$, extended from it as shown in the drawings, is arranged within the frame, and is supported therein, so as to be capable of freely revolving on its axis, and in a manner to cause the rows of teeth to be turned around between a series of curved grid-bars, $d\ d\ d$, each of which is extended across the frame A and underneath the drum C, as shown in the drawings, such grid-bars being arranged at suitable distances apart for the rows of the teeth $a\ a\ a$ to play between them.

From each grid-bar $d$, and at or near the middle of it, a tooth or cutter, E, projects downward, as shown in the drawings.

In the operation of this machine each grid-bar not only serves to support the tooth E, but as a rest to sustain the cultivator when the teeth E are forced to their greatest depth into the soil. It also serves to aid in pulverizing or breaking the soil. So with regard to the several teeth, E, they operate in conjunction with the rotary teeth $a\ a$ and hold the sod or earth while it is being crushed, broken, or cut up by the action of the teeth $a\ a$.

In using the cultivator it is to be drawn over the surface of the land with the teeth E E extending therein, and while being so moved the teeth $a\ a$ will take into the ground, and by the movement of the machine will produce a rotation of the drum C, from which they project, the rotary motion of the drum causing teeth $a\ a$ to be continually approaching toward and passing by the teeth E E.

By means of this useful implement so constructed land can be broken up or pulverized or prepared to great advantage for being planted.

I claim—

The combination of the rotary toothed drum or rotary series of teeth $a\ a$ with a set of stationary grid-bars, D D, and teeth E E, projecting therefrom, the whole being arranged, applied to a frame, A, and constituting a new or improved cultivator or agricultural implement, to operate substantially in manner and for the purpose or purposes as specified.

In testimony whereof I have hereunto set my signature.

WILLIAM TUCKER.

Witnesses:
BAILEY E. BORDEN,
ALBERT MOWRY.